US009443480B2

(12) United States Patent
Chu et al.

(10) Patent No.: US 9,443,480 B2
(45) Date of Patent: Sep. 13, 2016

(54) BISTABLE DISPLAY PANEL AND DATA DRIVING CIRCUIT THEREOF

(75) Inventors: Chia-Hsien Chu, Hsin-Chu (TW); Chun-Chi Lai, Hsin-Chu (TW); Yi-Chien Wen, Hsin-Chu (TW)

(73) Assignee: AU OPTRONICS CORP., Hsinchu (TW)

( * ) Notice: Subject to any disclaimer, the term of this patent is extended or adjusted under 35 U.S.C. 154(b) by 862 days.

(21) Appl. No.: 13/218,760

(22) Filed: Aug. 26, 2011

(65) Prior Publication Data

US 2012/0262439 A1 Oct. 18, 2012

(30) Foreign Application Priority Data

Apr. 12, 2011 (TW) ............................ 100112703 A

(51) Int. Cl.
*G06F 3/038* (2013.01)
*G09G 3/34* (2006.01)

(52) U.S. Cl.
CPC ...... *G09G 3/344* (2013.01); *G09G 2300/0473* (2013.01); *G09G 2300/08* (2013.01); *G09G 2310/0256* (2013.01); *G09G 2310/0275* (2013.01)

(58) Field of Classification Search
CPC ............ G09G 3/36; G09G 5/12; G09G 5/06; G09G 3/3291; G09G 3/32048; G09G 3/3233; G09G 3/3241; G09G 3/325; G09G 3/3258; G09G 2310/00; G09G 2310/0262; G09G 2310/0264; G09G 2310/0275; G09G 2310/0286; G09G 2310/0289; G09G 2310/0291; G09G 2310/0294; G09G 2310/0297; G09G 3/344; G09G 2300/0473; G09G 2300/08; G09G 2310/0256
USPC .................................................... 345/100, 87
See application file for complete search history.

(56) References Cited

U.S. PATENT DOCUMENTS

| | | | | |
|---|---|---|---|---|
| 7,215,308 | B2 * | 5/2007 | Orii et al. | 345/87 |
| 8,004,490 | B2 * | 8/2011 | Sakamoto et al. | 345/107 |
| 8,164,562 | B2 * | 4/2012 | Lee et al. | 345/100 |
| 2004/0130544 | A1 * | 7/2004 | Sun | G09G 3/3648 345/211 |
| 2006/0097982 | A1 * | 5/2006 | Arai | G09G 3/38 345/105 |

(Continued)

FOREIGN PATENT DOCUMENTS

TW 200620191 A 4/2013

OTHER PUBLICATIONS

Taiwan Patent Office, "Office Action", Feb. 19, 2014.

*Primary Examiner* — Temesgh Ghebretinsae
*Assistant Examiner* — Paras D Karki
(74) *Attorney, Agent, or Firm* — WPAT, PC; Justin King; Douglas Hosack

(57) ABSTRACT

An exemplary data driving circuit for providing a display data voltage to a data line includes a data driving module. The data driving module includes a display data buffer unit and a switching element. The display data buffer unit is used to provide the display data voltage. The switching element is electrically coupled between the display data buffer unit and the data line and determines whether to allow the display data voltage provided by the display data buffer unit to be transmitted to the data line according to a control signal. Furthermore, the control signal controls the switching element to be turned off when the display data voltage provided by the display data buffer unit equals a predetermined voltage. Moreover, a display panel using the above data driving circuit also is provided.

12 Claims, 3 Drawing Sheets

(56) References Cited

U.S. PATENT DOCUMENTS

| | | | | |
|---|---|---|---|---|
| 2006/0109229 | A1 | 5/2006 | Iwabuchi | |
| 2008/0068316 | A1* | 3/2008 | Maekawa | 345/87 |
| 2008/0129903 | A1* | 6/2008 | Hong et al. | 349/36 |
| 2008/0309674 | A1* | 12/2008 | Barrus | G09G 3/344 345/545 |
| 2009/0237392 | A1 | 9/2009 | Kajino | |
| 2009/0309870 | A1 | 12/2009 | Takei | |
| 2012/0013587 | A1* | 1/2012 | Yen | 345/211 |

* cited by examiner

BISTABLE DISPLAY PANEL AND DATA DRIVING CIRCUIT THEREOF

TECHNICAL FIELD

The disclosure relates to the display technology field, and more particularly to a display panel (e.g., a bistable display panel) and a data driving circuit thereof.

BACKGROUND

In a bistable display panel, the alternating current common voltages (AC Vcom) transition in each image frame may cause that pixels without the need of updating theirs display grey levels are mistakenly updated, resulting in the fading issue of display image.

FIG. 1 is a situation of display gray levels of pixels being mistakenly updated caused by the AC common voltage transition in the prior art. As depicted in FIG. 1, YDIO is a vertical start pulse input/output signal of each image frame, T is an image frame period, and Vcom is an AC common voltage. As seen from FIG. 1, in each image frame period T, the AC common voltage Vcom changes to a target voltage level at a time point that is at a half of the image frame period T. For example, in the first image frame period T of FIG. 1, the AC common voltage Vcom changes from a previous voltage level (e.g., −15V) to a target voltage level (e.g., +15V) and then is used as a target common voltage corresponding to the display data voltage in the first image frame period (i.e., current image frame period) T. Display data voltages (i.e., generally pixel data voltages) provided to pixels of the bistable display panel are generally set according to the target voltage level of AC common voltage Vcom in each image frame period, thereby determining whether to update the display grey levels of the respective pixels.

Specifically, as depicted in FIG. 1, in the first image frame period T, display data voltages respectively corresponding to a first gate line, a middle gate line and a last gate line represent that corresponding pixels are without the need of updating their display grey levels. In detail, with regard to the display data voltage corresponding to the middle gate line, because the time of which begins to be written into the corresponding pixel is synchronous with the transition of the AC common voltage Vcom and thus no voltage difference exists between the display data voltage and the AC common voltage Vcom, so that the original purpose of not updating its display gray level is achieved. However, as to the display data voltages respectively corresponding to the first and last gate lines, they have voltage differences with respect to the AC common voltage Vcom before and after transition respectively, so that the display gray levels of the corresponding pixels are mistakenly updated, resulting in the occurrence of fading issue in display image.

SUMMARY OF THE DISCLOSURE

Therefore, the disclosure is directed to provide a data driving circuit that overcomes the fading issue of display image in the prior art.

The disclosure further is directed to provide a display panel using above data driving circuit.

In particular, a data driving circuit in accordance with an embodiment is adapted for providing at least one display data voltage to at least one data line. The data driving circuit includes at least one data driving module. The data driving module includes a display data buffer unit and a switching element. The display data buffer unit is used to provide the display data voltage. The switching element is electrically coupled between the display data buffer unit and the data line and determines whether to allow the display data voltage provided by the display data buffer unit to be transmitted to the data line according to a control signal. Furthermore, the control signal controls the switching element to be turned off when the display data voltage provided by the display data buffer unit is the same as a predetermined voltage (e.g., a target common voltage corresponding to the display data voltage).

In one embodiment, the data driving module can further include a control signal storage unit that is electrically coupled to the switching element and stores a content of the control signal for controlling the switching element.

In one embodiment, the data driving circuit can further include a timing controller that provides a data supply clock signal for controlling a time of providing/outputting the display data voltage by the display data buffer unit.

In one embodiment, the above-described control signal storage unit determines a time of providing/outputting the control signal according to the data supply clock signal, and the time of providing the control signal by the control signal storage unit is synchronous with the time of providing the display data voltage by the display data buffer unit.

A display panel in accordance with another embodiment includes a plurality of pixels, a plurality of data lines, a plurality of gate lines and a data driving circuit. Each of the data lines is electrically coupled to some of the pixels, and each of the gate lines is electrically coupled to some of the pixels. The gate lines cooperative with the data lines to make that a display data voltage provided by any one of the data lines each time is only transmitted to one of the pixels. The data driving circuit includes a plurality of data driving modules, and each of the data driving modules includes a display data buffer unit and a switching element. The display data buffer unit is used to provide the display data voltage to a corresponding one of the data lines. The switching element is electrically coupled between the display data buffer unit and the corresponding data line and determines whether to allow the display data voltage provided by the display data buffer unit to be transmitted to the corresponding data line according to a control signal. Furthermore, the control signal controls the switching element to be turned off when the display data voltage provided by the display data buffer unit is the same as a predetermined voltage (e.g., a target common voltage corresponding to the display data voltage).

In short, the disclosure discloses a display panel which has the switching element between each display data buffer unit and the corresponding data line, so that when the display data voltage provided by the display data buffer unit is identical with the predetermined voltages (e.g., the target common voltage in the current image frame period), the switching element is controlled to be turned off and thus the data line electrically coupled thereto is data floating. Therefore, the issue of display grey level of pixel being mistakenly updated due to the transition of the common voltage can be suppressed, and thereby the fading issue of display image in the prior art can be effectively improved.

BRIEF DESCRIPTION OF THE DRAWINGS

The above objects and advantages of the disclosure will become more readily apparent to those ordinarily skilled in the art after reviewing the following detailed description and accompanying drawings.

DETAILED DESCRIPTION OF EMBODIMENTS

Figure 2:
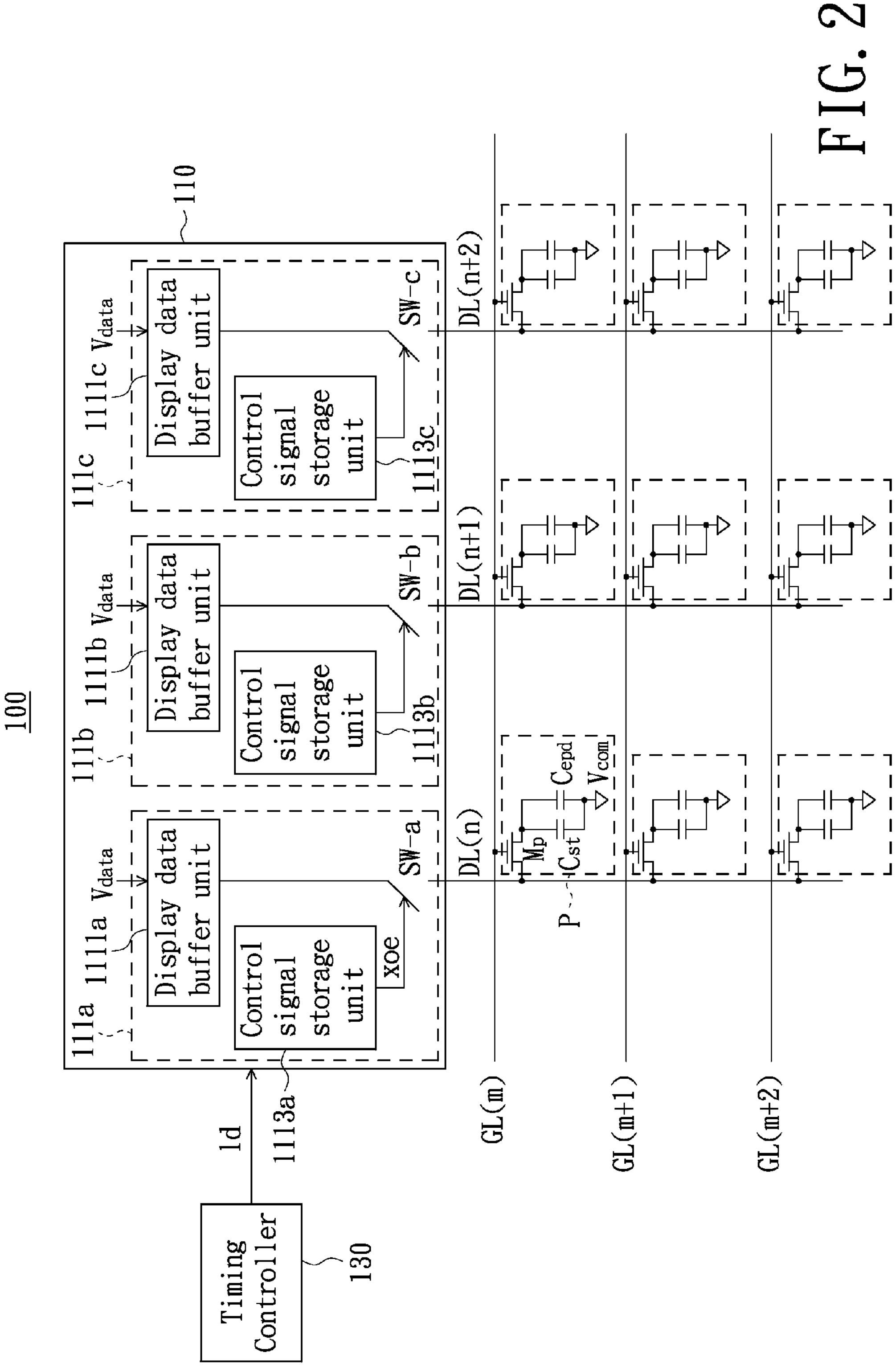
FIG. 2 is a schematic circuit diagram of a bistable display panel according to an exemplary embodiment.

FIG. 2 is a schematic circuit diagram of a bistable display panel 100 according to an exemplary embodiment. In the followings, an electrophoretic display panel (EPD) 100 is taken as an example with reference to FIG. 2 to describe an exemplary structure of the bistable display panel of the disclosure, but it is understood that the disclosure is not limited to this embodiment.

As shown in FIG. 2, the electrophoretic display panel 100 includes a plurality of data lines such as DL(n)~DL(n+2), a plurality of gate lines such as GL(m)~GL(m+2), a plurality of pixels P, a data driving circuit 110 and a timing controller 130, where both m and n generally are positive integers. In particular, the data lines DL(n)~DL(n+2) are positioned/arranged to intersect with the gate lines GL(m)~GL(m+2), and each of the pixels P is electrically coupled to one of the data lines DL(n)~DL(n+2) and one of the gate lines GL(m)~GL(m+2). In other words, each of the data lines DL(n)~DL(n+2) is electrically coupled to some of the plurality of pixels P, and each of the gate lines GL(m)~GL(m+2) is also electrically coupled to some of the plurality of pixels P, so that the gate lines GL(m)~GL(m+2) cooperative with the data lines DL(n)~DL(n+2) are to make that a display data voltage provided by any one of the data lines DL(n)~DL(n+2) each time is only transmitted to one of the pixels P. More particularly, each of the pixels P mainly includes a pixel transistor Mp, a storage capacitor Cst and a display capacitor Cepd. A gate of the pixel transistor Mp is electrically coupled to a corresponding one of the gate lines GL(m)~GL(m+2), a drain of the pixel transistor Mp is electrically coupled to a corresponding one of the data lines DL(n)~DL(n+2), and a source of the pixel transistor Mp is electrically coupled to a common voltage Vcom through the storage capacitor Cst and the display capacitor Cepd. Herein, the storage capacitor Cst and the display capacitor Cepd are electrically connected in parallel.

The data driving circuit 110 includes a plurality of data driving modules such as 111*a*, 111*b* and 111*c*. Each of the data driving modules 111*a*, 111*b*, and 111*c* is electrically coupled to a corresponding one of the data lines DL(n)~DL(n+2) to provide a display data voltage to the corresponding data line. Particularly, the data driving module 111*a* includes a display data buffer unit 1111*a*, a switching element SW-a and a control signal storage unit 1113*a*. The display data buffer unit 1111*a* is received the display data voltage Vdata and temporarily stores a content of the display data voltage Vdata therein. The display data buffer unit 1111*a* is electrically coupled to the data line DL(n) through the switching element SW-a and thereby provides the content of the temporarily stored display data voltage Vdata to the data line DL(n) when the switching element SW-a is controlled to be turned on. The control signal storage unit 1113*a* stores a content of a control signal xoe such as digital "0" or "1" therein for controlling on-off states of the switching element SW-a.

Similarly, the data driving module 111*b* includes a display data buffer unit 1111*b*, a switching element SW-b and a control signal storage unit 1113*b*. The display data buffer unit 1111*b* is received another display data voltage Vdata and temporarily stores a content of the display data voltage Vdata therein. The display data buffer unit 1111*b* is electrically coupled to the data line DL(n+1) through the switching element SW-b and thereby provides the content of the temporarily stored display data voltage Vdata to the data line DL(n+1) when the switching element SW-b is controlled to be turned on. The control signal storage unit 1113*b* stores a content of another control signal xoe such as digital "0" or "1" therein for controlling on-off states of the switching element SW-b. The data driving module 111*c* includes a display data buffer unit 1111*c*, a switching element SW-c and a control signal storage unit 1113*c*. The display data buffer unit 1111*c* is received still another display data voltage Vdata and temporarily stores a content of the display data voltage Vdata therein. The display data buffer unit 1111*c* is electrically coupled to the data line DL(n+2) through the switching element SW-c and thereby provides the content of the temporarily stored display data voltage Vdata to the data line DL(n+2) when the switching element SW-c is controlled to be turned on. The control signal storage unit 1113*c* stores a content of still another control signal xoe such as digital "0" or "1" therein for controlling on-off states of the switching element SW-c.

The timing controller 130 is electrically coupled to the data driving circuit 110 and can be used to provide various clock signals required by internal operations for the data driving circuit 110, such as can be used to provide a data supply clock signal 1*d* applied to the data driving modules 111*a*, 111*b*, and 111*c* for controlling times of providing the display data voltages Vdata by the respective display data buffer units 1111*a*, 1111*b* and 1111*c* and times of providing the control signals xoe by the respective control signal storage units 1113*a*, 1113*b* and 1113*c*. Generally, the times of providing the display data voltages Vdata by the respective display data buffer units 1111*a*, 1111*b* and 1111*c* are respectively synchronous with the corresponding times of providing the control signals xoe by the respective control signal storage units 1113*a*, 1113*b* and 1113*c*. It is noted that the timing controller 130 can be a circuit module externally independent from the data driving circuit 110, or a part of the data driving circuit 110, which is determined according to actual design requirements.

Figure 1:
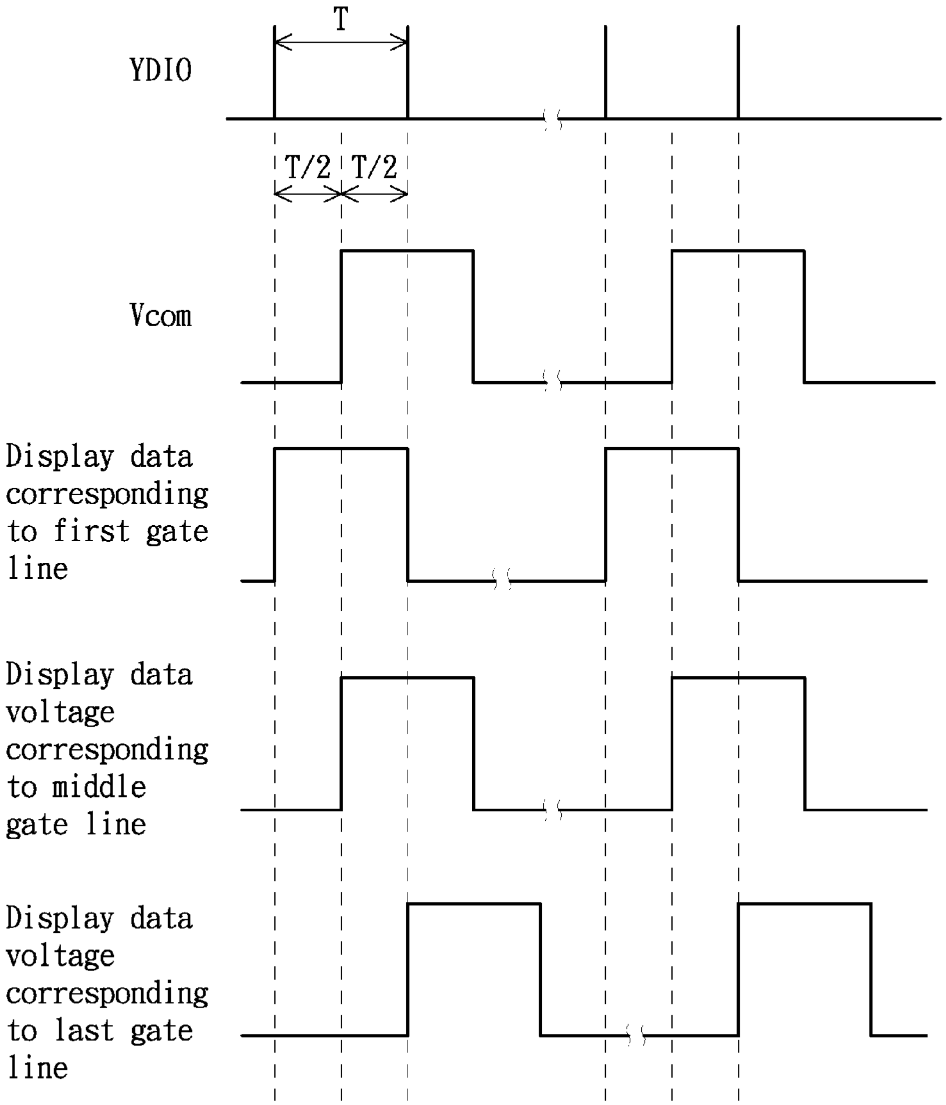
FIG. 1 (Related Art)
FIG. 1 is a situation of display gray levels of pixels being mistakenly updated caused by the transition of AC common voltage in the prior art.
Figure 3:
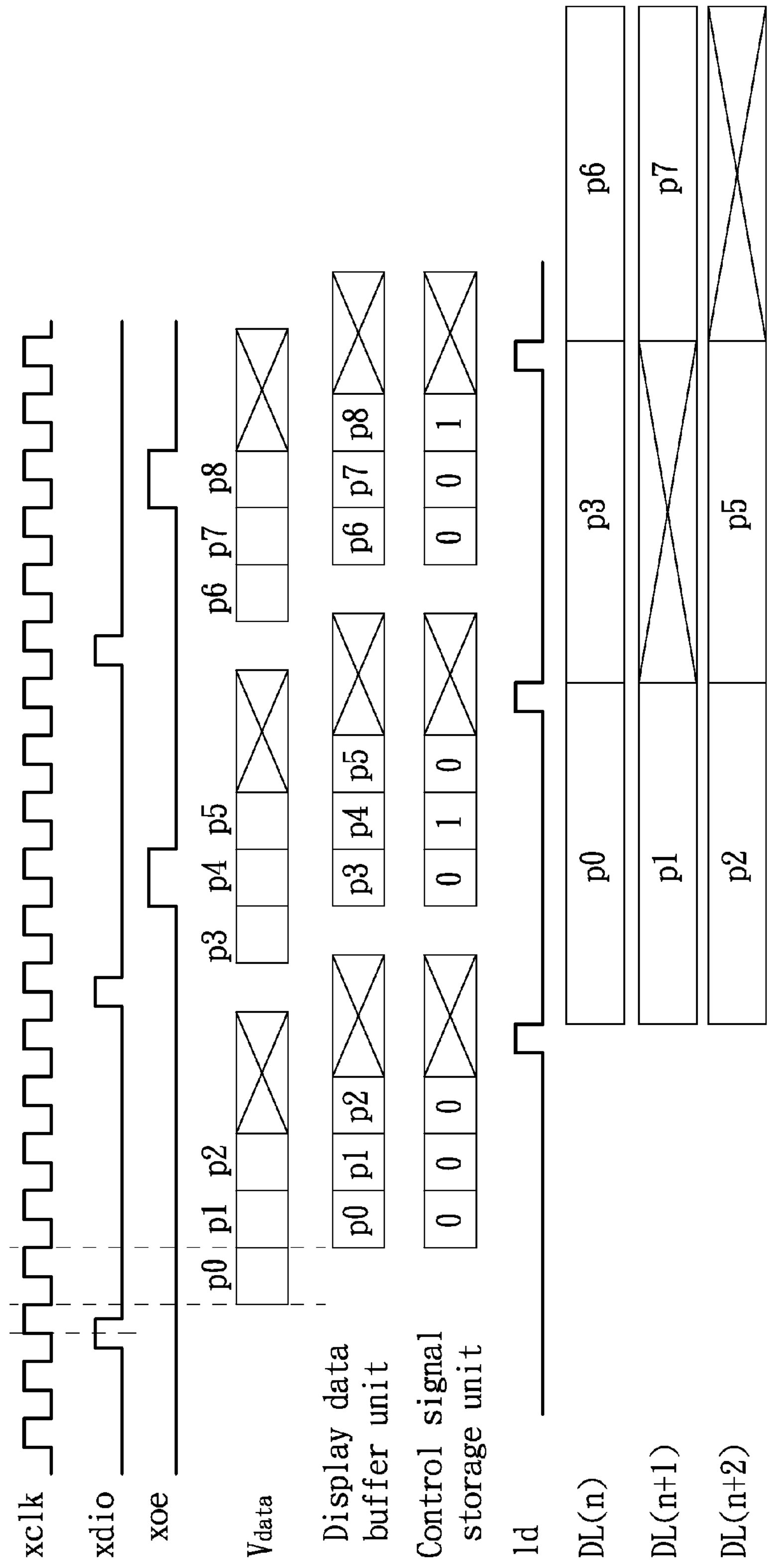
FIG. 3 is an operation principle process of the bistable display panel shown in FIG. 1 during image display.

Referring to FIG. 2 and FIG. 3 together, FIG. 3 is an operation principle process of the electrophoretic display panel in FIG. 1 during image display. In FIG. 3, xclk is a display data generation clock signal for each display data voltage, xdio is a horizontal display data input/output clock signal for each group of display data voltages corresponding to a single gate line, xoe is the control signal, and p0~p8 are contents of display data voltages Vdata.

It can be known from FIG. 3 that: (1) in the first frequency period of the horizontal display data input/output clock signal xdio, the contents of the display data voltages Vdata stored in the respective display data buffer units 1111*a*, 1111*b*, 1111*c* sequentially are p0, p1 and p2, and the contents of the control signals xoe respectively stored in the corresponding control signal storage units 1113*a*, 1113*b* and 1113*c* sequentially are digital "0", "0" and "0"; (2) in the second frequency period of the horizontal display data input/output clock signal xdio, the contents of the display data voltages Vdata stored in the respective display data buffer units 1111*a*, 1111*b*, 1111*c* sequentially are p3, p4 and p5, and the contents of the control signals xoe respectively stored in the corresponding control signal storage units 1113*a*, 1113*b* and 1113*c* sequentially are digital "0", "1" and "0"; and (3) in the third frequency period of the horizontal display data input/output clock signal xdio, the contents of the display data voltages Vdata stored in the respective display data buffer units 1111*a*, 1111*b*, 1111*c* sequentially are p6, p7 and p8, and the contents of the control signals xoe respectively stored in the corresponding control signal storage units 1113*a*, 1113*b* and 1113*c* sequentially are digital "0", "0" and "1".

(i) After the first pulse of the data supply clock signal 1*d* shown in FIG. 3 is come, since the contents of the control signals xoe stored in the respective control signal storage units 1113*a*, 1113*b* and 1113*c* are respectively digital "0", "0" and "0", which indicates that the contents p0, p1, p2 of the display data voltages Vdata temporarily stored in the respective display data buffer units 1111*a*, 1111*b*, 1111*c* are all different from the target common voltage Vcom in the current image frame period, the switching elements SW-a, SW-b and SW-c all are controlled by the respective control signals xoe to be turned on. Thus, the contents p0, p1, p2 of the display data voltages Vdata temporarily stored in the respective display data buffer units 1111*a*, 1111*b*, 1111*c* are respectively transmitted to the data lines DL(n)~DL(n+2) and then written into corresponding pixels P for display grey level update.

(ii) After the second pulse of the data supply clock signal 1*d* shown in FIG. 3 is come, the contents of the control signals xoe stored in the respective control signal storage units 1113*a*, 1113*b* and 1113*c* are respectively digital "0", "1" and "0", which indicates that the contents p3 and p5 of the display data voltages Vdata temporarily stored in the respective display data buffer units 1111*a* and 1111*c* are different from the target common voltage Vcom in the current image frame period, but the content p4 of the display data voltage Vdata temporarily stored in the display data buffer unit 1111*b* is the same as the target common voltage Vcom in the current image frame period. Thus, the switching elements SW-a and SW-c are controlled by the respective control signals xoe to be turned on and thereby the contents p3 and p5 of the display data voltages Vdata temporarily stored in the respective display data buffer units 1111*a* and 1111*c* are respectively transmitted to the data lines DL(n) and DL(n+2) and then written into corresponding pixels P for display grey level update. However, the switching element SW-b is controlled by the control signal xoe to be turned off and thereby the content p4 of the corresponding display data voltage temporarily stored in the display data buffer unit 1111*b* is unable to be transmitted to the data line DL(n+1), which makes the data line DL(n+1) to be data floating. Therefore, the display gray level of the pixel P corresponding to the data line DL(n+1) is prevented from being mistakenly updated resulting from the transition of the common voltage Vcom in the current image frame period, and therefore the original purpose of not updating its display grey levels is achieved.

(iii) After the third pulse of the data providing pulse signal 1*d* shown in FIG. 3 is come, the contents of the control signals xoe stored in the respective control signal storage units 1113*a*, 1113*b* and 1113*c* are respectively digital "0", "0" and "1", which indicates that the contents p6 and p7 of the display data voltages Vdata temporarily stored in the respective display data buffer units 1111*a* and 1111*b* are different from the target common voltage Vcom in the current image frame period, but the content p8 of the display data voltage Vdata temporarily stored in the display data buffer unit 1111*c* is the same as the target common voltage Vcom in the current image frame period. Thus, the switching elements SW-a and SW-b are controlled by the corresponding control signals xoe to be turned on and the contents p6 and p7 of the display data voltages temporarily stored in the respective display data buffer units 1111*a* and 1111*cb* correspondingly are respectively transmitted to the data lines DL(n) and DL(n+1) and then written into corresponding pixels P for display grey level update. The switching element SW-c is controlled by the corresponding control signal xoe to be turned off and thereby the content p8 of the display data voltage Vdata temporarily stored in the display data buffer unit 1111*c* is unable to be transmitted to the data line DL(n+2), which makes the data line DL(n+2) to be data floating. Therefore, the display gray level of the pixel P corresponding to the data line DL(n+2) is prevented from being mistakenly updated resulting from the transition of the common voltage Vcom in the current image frame period, and the original purpose of not updating the display grey levels is achieved as a result.

As known from the above-described exemplary embodiment, the switching elements SW-a, SW-b and SW-c are additionally configured/arranged respectively between the display data buffer units 1111*a*, 1111*b*, 1111*c* and corresponding data lines DL(n)~DL(n+2). When the display data voltage(s) provided by the display data buffer units 1111*a*, 1111*b* and/or 1111*c* is/are equal to a predetermined voltage (e.g., the target common voltage in the current image frame period), the corresponding switching element(s) SW-a, SW-b and/or SW-c is/are made to be turned off, and thus the corresponding one(s) of data lines DL(n)~DL(n+2) electrically coupled to the switching elements SW-a, SW-b and SW-c is/are made to be data floating. Therefore, the issue of display grey level of pixel being mistakenly updated caused by the transition of the common voltage can be suppressed, so that the fading issue of displayed image in the prior art is effectively improved as a result.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data driving circuit for providing at least one display data voltage to at least one data line, comprising:

at least one data driving module, the data driving module comprising:

a display data buffer unit, for providing the display data voltage; and a switching element, electrically coupled between the display data buffer unit and the data line and subjected to the control of a control signal to determine whether to allow the display data voltage provided by the display data buffer unit to be transmitted to the data line;

wherein the switching element is controlled by the control signal to be turned off when the display data voltage provided by the display data buffer unit is the same as a predetermined voltage, wherein the predetermined voltage is a target common voltage for the display data voltage in each image frame.

2. The data driving circuit of claim 1, wherein the data driving module further comprises:

a control signal storage unit, electrically coupled to the switching element, for storing a content of the control signal.

3. The data driving circuit of claim 2, further comprising:
a timing controller, for providing a data supply clock signal to control a time of providing the display data voltage by the display data buffer unit.

4. The data driving circuit of claim 3, wherein the control signal storage unit determines a time of providing the control signal according to the data supply clock signal, and the time of providing the control signal by the control signal storage unit is synchronous with the time of providing the display data voltage by the display data buffer unit.

5. The data driving circuit of claim 3, wherein the amount of the at least one data driving module is multiple, and correspondingly the data supply clock signal controls the times of providing the display data voltages by the respective display data buffer units of all of the multiple data driving modules.

6. The data driving circuit of claim 1, wherein the switching element is controlled by the control signal to be turned on to thereby allow the display data voltage provided by the display data buffer unit to be transmitted to the data line when the display data voltage provided by the display data buffer unit is different from the predetermined voltage.

7. A display panel comprising:
a plurality of pixels;
a plurality of data lines, each of the data lines electrically coupled to some of the pixels;
a plurality of gate lines, each of the gate lines electrically coupled to some of the pixels, and the gate lines cooperative with the data lines to make a display data voltage provided by any one of the data lines each time only be transmitted to one of the pixels; and
a data driving circuit, comprising a plurality of data driving modules, each of the data driving modules comprising:
a display data buffer unit, for providing the display data voltage to a corresponding one of the data lines; and
a switching element, electrically coupled between the display data buffer unit and the corresponding data line, for determining whether to allow the display data voltage provided by the display data buffer unit to be transmitted to the corresponding data line according to a control signal, wherein the control signal controls the switching element to be turned off when the display data voltage provided by the display data buffer unit is the same as a predetermined voltage, wherein the predetermined voltage is a target common voltage for the display data voltage in each image frame.

8. The display panel of claim 7, wherein each of the data driving modules further comprises:
a control signal storage unit, electrically coupled to the switching element of the data driving module, for storing a content of the control signal for controlling the switching element of the data driving module.

9. The display panel of claim 8, further comprising:
a timing controller, for providing a data supply clock signal to control a time of providing the display data voltage by the display data buffer unit of each of the data driving modules.

10. The display panel of claim 9, wherein the control signal storage unit of each of the data driving modules determines a time of providing the control signal according to the data supply clock signal, and the time of providing the control signal by the control signal storage unit of each of the data driving modules is synchronous with the time of providing the display data voltage by the display data buffer unit of the same data driving module.

11. The display panel of claim 7, wherein the control signal controls the switching element to be turned on to thereby allow the display data voltage provided by the display data buffer unit to be transmitted to the corresponding data line when the display data voltage provided by the display data buffer unit is different from the predetermined voltage.

12. The display panel of claim 7, wherein the display panel is a bistable display panel.

* * * * *